(12) United States Patent
Chao (10) Patent No.: US 9,896,139 B2
(45) Date of Patent: Feb. 20, 2018

(54) ROBOT (71) Applicant: Chi-Mou Chao, Zhubei (TW)

(72) Inventor: Chi-Mou Chao, Zhubei (TW)

( * ) Notice: Subject to any disclaimer, the term of this patent is extended or adjusted under 35 U.S.C. 154(b) by 34 days.

(21) Appl. No.: 14/924,073

(22) Filed: Oct. 27, 2015

(65) Prior Publication Data
US 2016/0347384 A1 Dec. 1, 2016

(30) Foreign Application Priority Data

May 27, 2015 (TW) .............................. 104116923 A (51) Int. Cl.
B60B 39/00 (2006.01)
B62D 55/265 (2006.01)
B62D 57/024 (2006.01)
A47L 1/02 (2006.01)
B25J 11/00 (2006.01)

(52) U.S. Cl.
CPC .............. *B62D 57/024* (2013.01); *A47L 1/02* (2013.01); *B25J 11/0085* (2013.01); *A47L 2201/00* (2013.01); *A47L 2201/04* (2013.01); *B62D 55/265* (2013.01); *G05D 2201/0202* (2013.01); *G05D 2201/0203* (2013.01); *Y10S 901/01* (2013.01)

(58) Field of Classification Search
CPC ............... B62D 57/024; A47L 2201/04; A47L 2201/00; A47L 1/02; G05D 2201/0203; G05D 2201/0202; B25J 11/00
See application file for complete search history.

(56) References Cited

U.S. PATENT DOCUMENTS

| | | | | |
|---|---|---|---|---|
| 5,161,631 A * | 11/1992 | Urakami | ................... | B24C 3/06 180/164 |
| 5,536,199 A * | 7/1996 | Urakami | ................ | B62D 57/00 15/98 |
| 5,551,525 A * | 9/1996 | Pack | .................... | B62D 57/032 180/8.1 |
| 5,592,998 A * | 1/1997 | Urakami | ................ | B62D 57/00 180/164 |
| 6,691,811 B2 * | 2/2004 | Bruntrup | ................... | A47L 1/02 114/222 |
| 6,999,850 B2 * | 2/2006 | McDonald | .............. | A47L 9/009 318/567 |
| 7,765,635 B2 * | 8/2010 | Park, II | .................... | A47L 9/009 15/319 |

(Continued)

FOREIGN PATENT DOCUMENTS

| | | | | |
|---|---|---|---|---|
| CN | 203662679 U | 6/2014 | | |
| WO | WO 2013149590 A1 * | 10/2013 | ............... | A47L 1/02 |

(Continued)

*Primary Examiner* — Tony H Winner
(74) *Attorney, Agent, or Firm* — Muncy, Geissler, Olds & Lowe P.C.

(57) ABSTRACT

A robot comprises a body, at least one traveling device, a suction cup and a pump module. The at least one traveling device disposed in the body is for causing the robot to move on a surface of a plate. The suction cup and the pump module are disposed in the body. The suction cup can move relative to the body. Upon an operation of the robot, the body, the suction cup and the plate form a closed space, and the closed space is kept at a negative pressure by use of the pump module.

10 Claims, 10 Drawing Sheets

(56) References Cited

U.S. PATENT DOCUMENTS

| | | | | |
|---|---|---|---|---|
| 8,434,504 B2* | 5/2013 | Simonette | A47L 1/02 134/172 |
| 8,435,359 B2* | 5/2013 | Chao | B08B 1/04 134/56 R |
| 9,022,159 B2* | 5/2015 | Urakami | A47L 1/02 180/197 |
| 9,102,369 B2* | 8/2015 | Urakami | B62D 57/00 |
| 9,215,962 B2* | 12/2015 | Qian | A47L 11/4066 |
| 2003/0009844 A1* | 1/2003 | Bruntrup | A47L 1/02 15/344 |
| 2003/0027508 A1* | 2/2003 | Urakami | B62D 57/024 451/88 |
| 2007/0016328 A1* | 1/2007 | Ziegler | A47L 5/14 700/245 |
| 2007/0235239 A1* | 10/2007 | Urakami | B62D 57/024 180/164 |
| 2011/0180098 A1* | 7/2011 | Lange | A47L 1/02 134/6 |
| 2013/0037050 A1* | 2/2013 | Chao | A47L 1/02 134/6 |
| 2014/0115894 A1* | 5/2014 | Gamboa | B62D 57/024 29/897.2 |
| 2014/0259475 A1* | 9/2014 | Doughty | A47L 9/0477 15/52.1 |
| 2015/0027493 A1* | 1/2015 | Baek | A47L 1/12 134/6 |
| 2015/0257622 A1* | 9/2015 | Qian | A47L 11/4066 15/319 |
| 2016/0069340 A1* | 3/2016 | Feng | A47L 1/02 417/521 |

FOREIGN PATENT DOCUMENTS

| | | | | |
|---|---|---|---|---|
| WO | WO 2015139607 A1 * | 9/2015 | | A47L 1/02 |
| WO | WO 2015139608 A1 * | 9/2015 | | A47L 1/02 |
| WO | WO 2015139618 A1 * | 9/2015 | | B62D 57/024 |

* cited by examiner

ROBOT

This application claims priority of No. 104116923 filed in Taiwan R.O.C. on May 27, 2015 under 35 USC 119, the entire content of which is hereby incorporated by reference.

BACKGROUND OF THE INVENTION

Field of the Invention

The present invention relates to a robot, and more particularly to a cleaner capable of cleaning a surface of a plate.

Related Art

Conventionally, doors and windows of the houses are cleaned after the doors and windows are opened or disassembled, while the doors and windows of the buildings are cleaned by workers of a cleaning company with a frame suspended outside the building, wherein a motor controls the suspended frame to go up and down, and a brush or a water jet is adopted to clean the doors and windows outside the building. However, the blowing wind tends to swing the suspended frame due to the unstable center of gravity. In order to prevent the windows and doors from being excessively brushed (the excessive brushing force causes the workers to slip or causes the dangerous accident that the cleaning apparatus falls and hurts people), the windows and doors only can be slightly flushed and cannot be completely cleaned.

Figure 1:
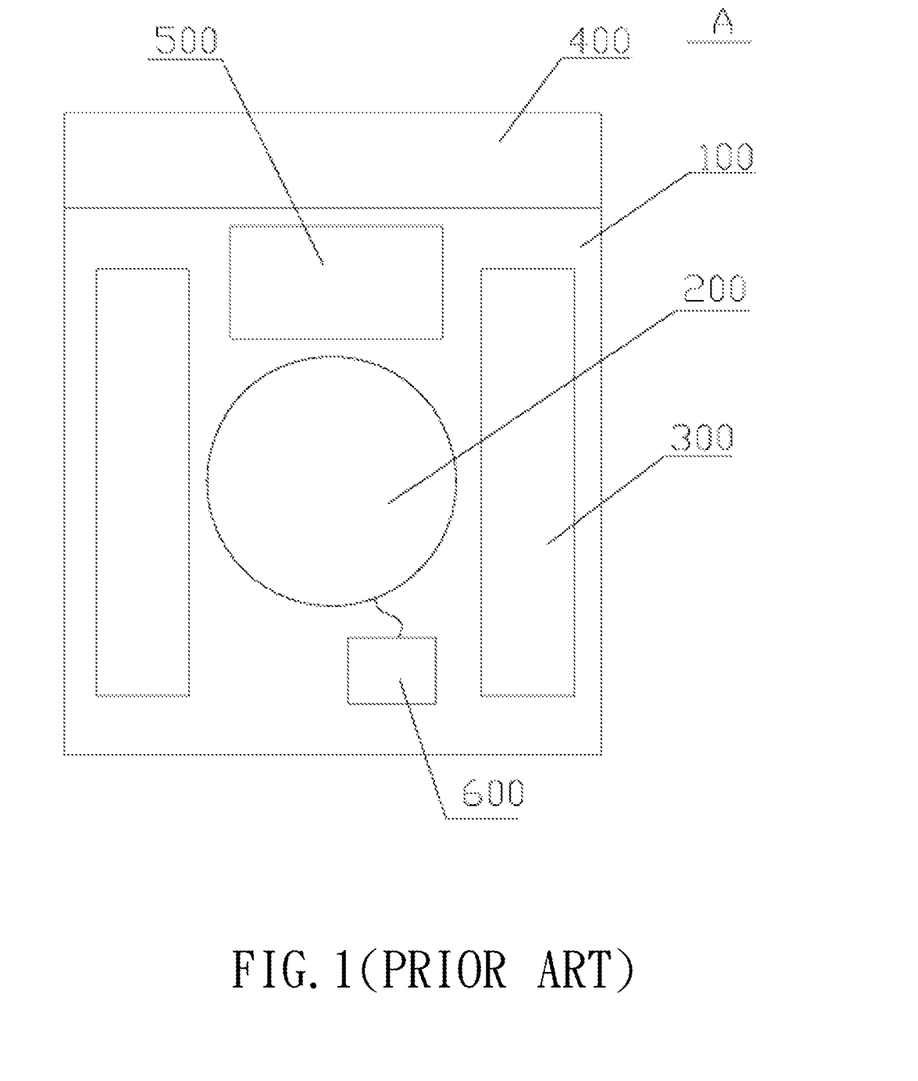
FIG. 1 is a schematic view showing a conventional adsorption robot.

FIG. 1 is a schematic view showing a conventional adsorption robot disclosed in China Patent No. CN 203662679 U. Referring to FIG. 1, an adsorption robot A comprises a robot body 100, on which an adsorption unit 200, a traveling unit 300, an operational unit 400 and a control unit 500 are disposed. The adsorption unit 200 mainly comprises a suction cup and an exhaust blower connected thereto. The traveling unit 300 is disposed outside a space defined by the suction cup of the adsorption unit 200. The exhaust blower exhausts the air from the suction cup to form a negative pressure inside the suction cup, so that the suction cup is absorbed onto the to-be-operated surface. Under the control of the control unit, the adsorption robot A travels on the to-be-operated surface through the traveling unit. A cleaning cloth for wiping the operational surface is disposed on the operational unit 400. A current sensor 600 is disposed on a current input terminal of the exhaust blower. The control unit receives the current information detected by the current sensor and judges whether the suction cup is in a vacuum state or a leakage state.

Figure 2:
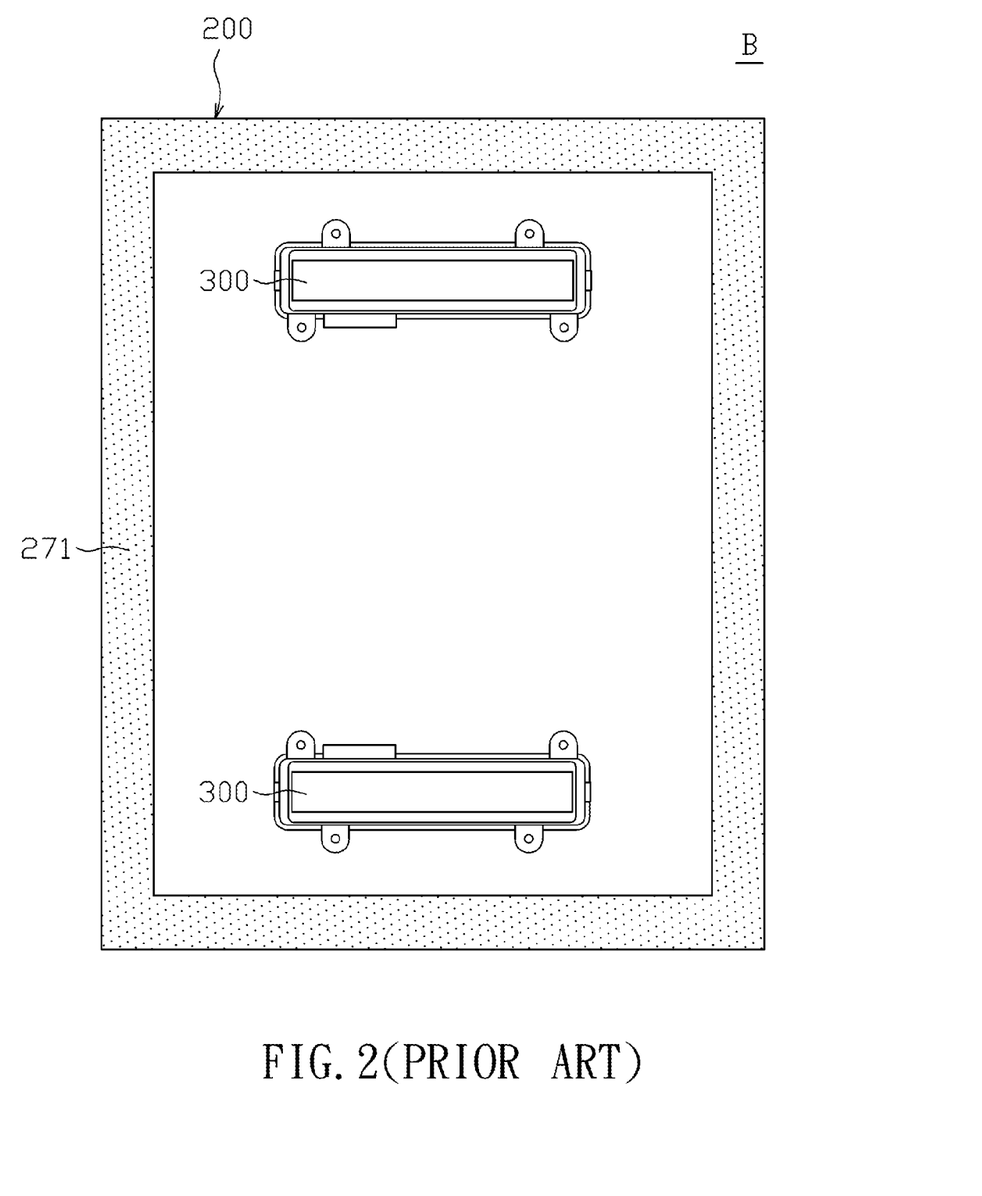
FIG. 2 is a schematic view showing another conventional robot.

FIG. 2 is a schematic view showing another conventional robot. The conventional robot B in FIG. 2 is substantially the same as the conventional robot A in FIG. 1 except for the difference that the traveling unit 300 is disposed inside the space defined by the suction cup of the adsorption unit 200. More specifically, a wiping cleaning cloth 271 is adhered to the bottom surface of each frame edge of the adsorption unit 200, and the traveling unit 300 is disposed inside the frame. When the traveling unit 300 travels, the cleaning cloth can wipe the surface of the window.

However, according to the prior art, when the traveling unit 300 travels on the obstructer, each of the robots A and B is entirely tilted or lifted up, thereby causing the leakage of the closed space, so that the robots A and B cannot be absorbed onto the operation surface. In addition, when the ratio of the acting force of the traveling unit to the acting force of the operational unit becomes improper, the robot tends to skid and cannot travel forward, or the acting force of the operational unit is too small to clean the operation surface.

SUMMARY OF THE INVENTION

According to one embodiment of the present invention, a robot adapted to movement on a surface of a plate is provided. The robot comprises a body, at least one traveling device, a suction cup and a pump module. The at least one traveling device disposed in the body is for causing the robot to move on the surface of the plate. The suction cup is disposed in the body. The pump module is disposed in the body. The suction cup can move relative to the body. Upon an operation of the robot, the body, the suction cup and the plate form a closed space. The closed space is kept at a negative pressure by use of the pump module.

In one embodiment, an area of a first region of a space defined by the suction cup is larger than an area of a second region of a space defined by the body.

In one embodiment, an acting force caused by the negative pressure of the closed space is distributed on the at least one traveling device and the suction cup substantially according to a ratio of the area of the second region to an area of a residual region of the area of the first region outside the area of the second region. In this embodiment, the area ratio (i.e., the ratio of the acting force of the traveling unit to the acting force of the operational unit) on the suction cup can be designed to overcome the manufacturing tolerance or the improper distribution of the acting force generated by an obstructer causing the poor operation of the robot.

In one embodiment, the suction cup is formed with multiple through holes, and pivots are inserted into the through holes so that the suction cup is movably fixed on the body and is movable along long axes of the pivots.

In one embodiment, a length of the pivot is longer than a thickness of a portion of the suction cup defining the through hole.

In one embodiment, the long axes of the pivots are substantially parallel to a normal of a bottom surface of the suction cup, so that the suction cup is movable in a direction along the normal of the bottom surface of the suction cup.

In one embodiment, the robot is a cleaner. Preferably, the robot further comprises a cleaning cloth attached to a bottom surface of the suction cup.

In one embodiment, the robot further comprises at least one elastic member disposed between the suction cup and the body, wherein elastic forces of the elastic members keep the suction cup in close contact with the surface of a plate. Preferably, an area of a first region of a space defined by the suction cup is substantially equal to an area of a second region of a space defined by the body.

In one embodiment, the body of the robot further defines a chamber communicating with the closed space, and the robot further comprises a pneumatic sensor, which is disposed in the chamber and for sensing a pneumatic pressure of the closed space.

In one embodiment, the robot further comprises at least one edge sensor, which is disposed on a side surface or a bottom surface of the body and for sensing an edge of the plate.

According to one embodiment of the present invention, the suction cup is disposed such that it can move relatively to the body. So, when the at least one traveling device travels on the obstructer, the suction cup moves relative to the body and can be in close contact with the plate to keep the airtight property of the closed space defined by the plate, the body and the suction cup, and thus to prevent the leakage of the closed space.

DETAILED DESCRIPTION OF THE INVENTION

The present invention relates to a robot adapted to movement on a surface of a plate. The robot may be a toy, a remote control car, a cleaner, a window cleaner or the like. In the following, the cleaner or window cleaner is described as an example. However, the present invention is not restricted thereto.

Figure 3A:
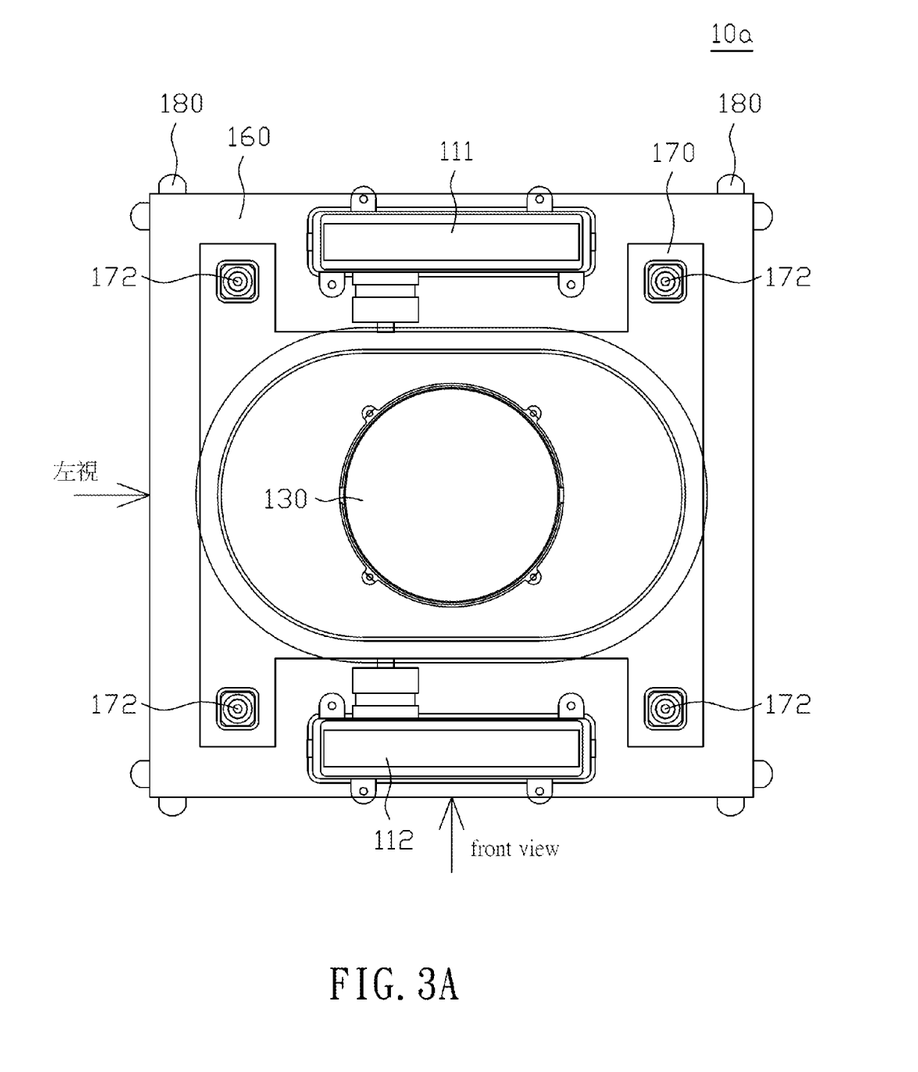
FIG. 3A is a top view showing a cleaner according to one embodiment of the present invention.
Figure 3B:
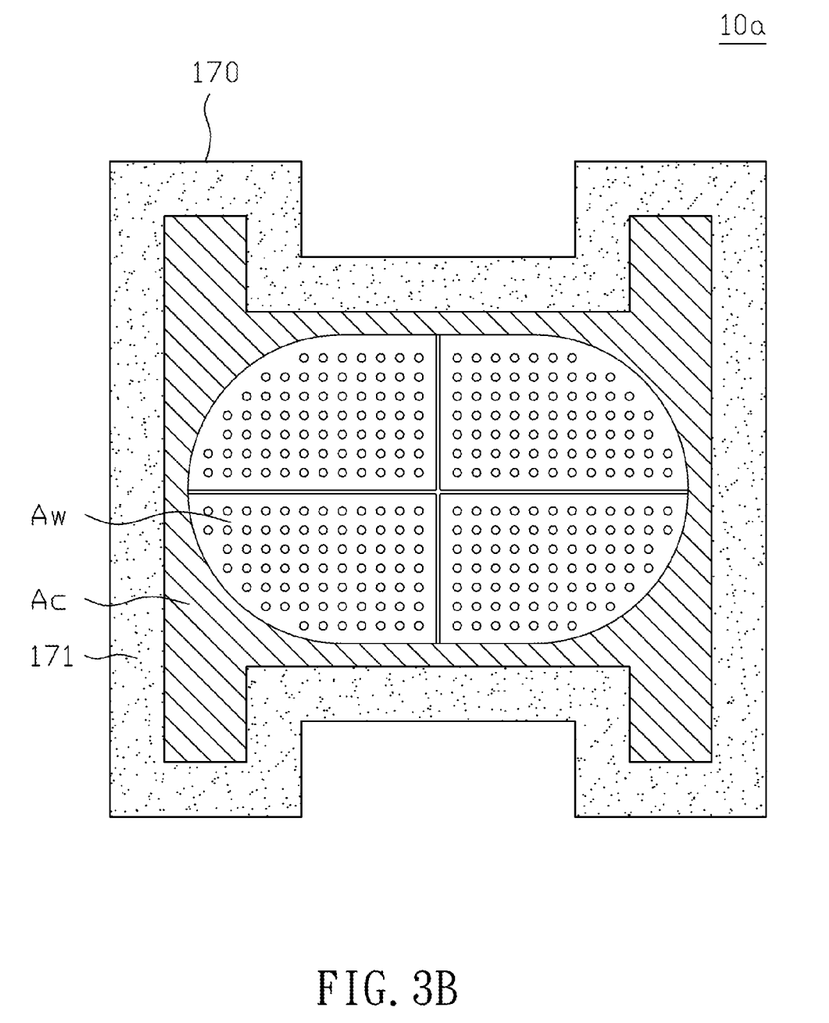
FIG. 3B is a bottom view showing the cleaner according to the embodiment of the present invention.
Figure 3C:
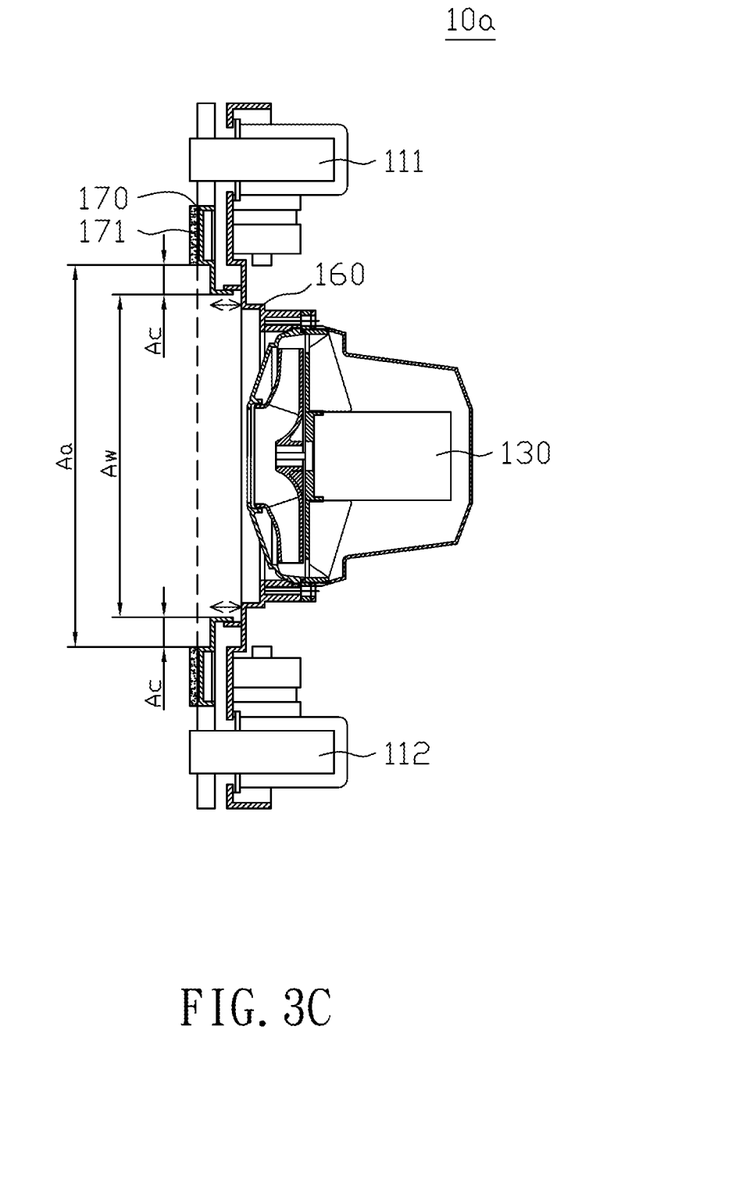
FIG. 3C is a left view showing the cleaner according to the embodiment of the present invention.
Figure 3D:
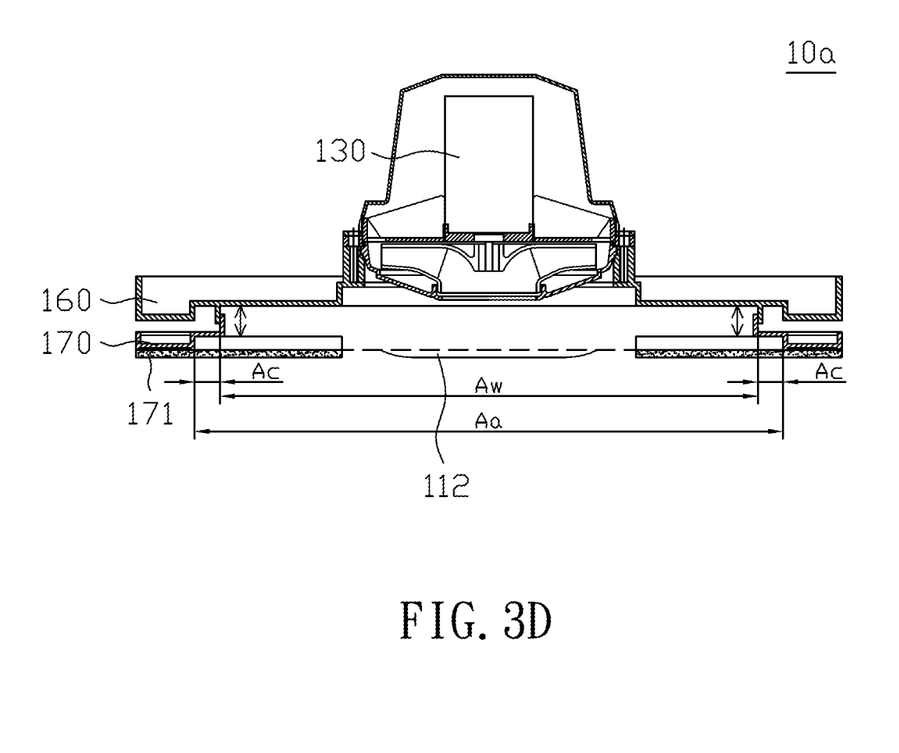
FIG. 3D is a front view showing the cleaner according to the embodiment of the present invention.

FIG. 3A is a top view showing a cleaner according to one embodiment of the present invention. FIG. 3B is a bottom view showing the cleaner according to the embodiment of the present invention. FIG. 3C is a left view showing the cleaner according to the embodiment of the present invention. FIG. 3D is a front view showing the cleaner according to the embodiment of the present invention.

Referring to FIGS. 3A to 3D, a cleaner 10a can be attached to a plate (not shown) and move on the plate to clean particles on a surface of the plate. The plate may be, for example, an upright window. The cleaner 10a comprises traveling devices 111 and 112, a body 160, a suction cup 170 and a pump module 130 (see FIG. 4). As shown in FIGS. 3B and 3C, the body 160 and the suction cup 170 commonly define a space, and the pump module 130 communicates with the space. Upon operation, the cleaner 10a is placed on the plate, and the pump module 130 pumps the air from the closed space defined by the plate, the body 160 and the suction cup 170, and the closed space is kept at the negative pressure so that the cleaner 10a is absorbed onto the surface of the plate. The traveling devices 111 and 112 may be moving or sliding elements, such as pulleys, rollers or the like. In addition, after the traveling devices 111 and 112 are driven, the cleaner 10a can move on the surface of the plate.

As shown in FIG. 3C, the suction cup 170 is disposed such that it can move relative to the body 160. Referring again to FIG. 3A more specifically, the suction cup 170 is formed with multiple through holes, wherein multiple pivots 172 are inserted into the through holes, and a length of the pivot 172 is longer than a thickness of a portion of the suction cup 170 defining the through hole, so that the suction cup 170 can move along the long axes of the pivots 172, and the suction cup 170 can be movably fixed onto the body 160 through the multiple pivots 172. Preferably, the long axes of the pivots 172 are substantially parallel to a normal of the bottom surface of the suction cup 170, so that the suction cup 170 can move in the direction of the normal of the bottom surface of the suction cup 170. That is, the long axes of the pivots 172 are substantially parallel to the normal of the surface of the plate, so that the suction cup 170 can move along the direction of the normal of the surface of the plate.

In the prior art, the traveling unit 300 has no resilience, and needs to work with the resilience of the suction cup of the adsorption unit 200, so that the closed space forms the airtight property. However, the drawback of forming the airtight property according to the resilience of the suction cup is as follows. When the traveling unit 300 encounters the obstructer, the entire robot A or B raises because the traveling unit 300 has no resilience, thereby causing the leakage of the closed space.

Compared with the prior art, the suction cup 170 of this embodiment is disposed such that it can move relative to the body 160. Thus, when the traveling devices 111 and 112 travel on the obstructer, the suction cup 170 moves relative to the body 160 such that it can be in close contact with the plate to keep the airtight property of the closed space defined by the plate, the body 160 and the suction cup 170, thereby preventing the leakage of the closed space. Alternatively, when the suction cup 170 presses the obstructer, the body of the cleaner 10a still can move relative to the suction cup 170 and cannot raise. Thus, the negative pressure of the closed space still can apply an acting force to the body 160.

As shown in FIGS. 3B and 3C, the traveling devices 111 and 112 are disposed outside the closed space in one embodiment. In addition, the area of the first region Aa of the space defined by the suction cup 170 is larger than the area of the second region Aw of the space defined by the body 160, and the area of the first region Aa minus the area of the second region Aw is equal to the area of the residual region Ac. The residual region Ac is the region of the first region Aa outside the second region Aw. Because the first region Aa and the second region Aw communicate with each other, the first region Aa is the space defined by the suction cup 170, and the second region Aw is defined by the body 160, the acting force caused by the negative pressure of the overall closed space is distributed on the traveling devices 111 and 112 and the suction cup 170 substantially according to the ratio of the area of the second region Aw to the area of the residual region Ac.

Compared with the prior art, the closed space is integral and cannot be divided. So, it is very difficult to clearly distribute the acting force on the traveling unit 300 and the acting force on the suction cup of the adsorption unit 200, wherein the two acting forces are caused by the negative pressure of the closed space. The results caused thereby substantially comprise the following types. If the acting force on the traveling unit 300 is large, then the acting force on the suction cup of the adsorption unit 200 is small, thereby causing the unclean problem. If the acting force on the traveling unit 300 is further increased, then the acting force on the suction cup of the adsorption unit 200 is further decreased. Thus, the robot A or B cannot be further absorbed onto the vertical surface, and the robot A or B will fall. If the robot further encounters an obstructer, then the overall robot A or B is lifted up, thereby causing the leakage of the closed space and the robot A or B to fall. If the acting force on the traveling unit 300 is small, then the acting force on the suction cup of the adsorption unit 200 is large, thereby causing the problem that the traveling unit 300 skids and the robot A or B cannot travel. More specifically, when 80% of the acting force caused by the negative pressure of the closed space is exerted onto the suction cup of the adsorption unit 200, the traveling unit 300 skids, and the robot A or B cannot travel.

According to the prior arts of FIGS. 1 and 2, the negative pressure of the closed space defined by the suction cup absorbs the robot A or B onto the operational surface. Thus, the traveling unit 300 of the conventional robot A or B and the suction cup of the adsorption unit 200 are integral and cannot be divided, and the position where the acting force of the negative pressure is exerted cannot be distributed. When the traveling unit 300 travels on the obstructer, the overall robots A and B are tilted or lifted up, thereby causing the leakage of the closed space, and the robots A and B cannot be absorbed onto the operation surface.

In contrast, according to the designed structure of this embodiment, the acting forces on the traveling devices 111 and 112 are substantially the negative pressure caused by the second region Aw, and the acting force on the suction cup 170 is the negative pressure caused by the residual region Ac. Thus, the acting forces on the traveling devices 111 and 112 and the acting force on the suction cup 170 can be kept constant. When the traveling devices 111 and 112 travel on the obstructer, there is still a predetermined force exerting onto the suction cup 170 to prevent the leakage of the closed space, so that the cleaner 10a is absorbed onto the operation surface through the predetermined force.

In one embodiment, the suction cup 170 may further comprise a cleaning cloth 171 attached to the bottom surface of the suction cup 170. The cleaning cloth 171 is resilient. When the negative pressure is kept in the closed space, and the atmosphere pressure causes an acting force exerted on the cleaner 10a to press the cleaner 10a onto the plate, the resilience of the cleaning cloth 171 maintains the airtight property of the closed space.

Figure 5:
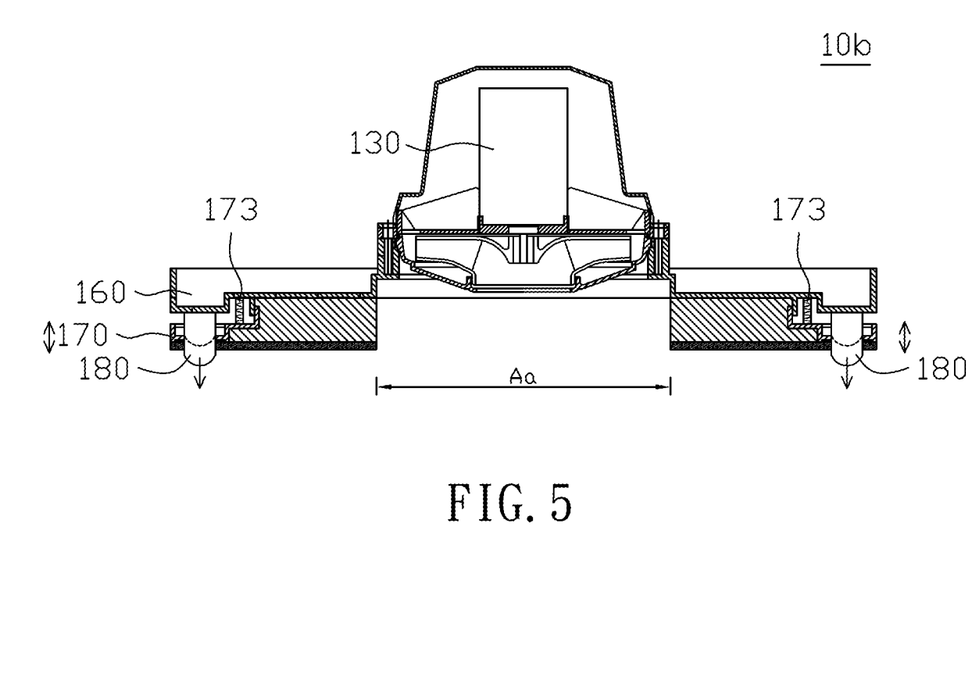
FIG. 5 is a front view showing a cleaner according to another embodiment of the present invention.

Referring again to FIG. 3A, the cleaner 10a in one embodiment further comprises multiple edge sensors 180 projecting beyond four side surfaces of the body 160, respectively. When the cleaner travels to the edge of the window, the edge sensor 180 presses against the edge of the window and then retracts inwards. At this time, the control system 140 (to be described later) senses a signal transmitted from the edge sensor 180, immediately stops the cleaner 10a from moving forwards, and enables the cleaner 10a to make a turn or move backwards. As shown in FIG. 5 (to be described later), the edge sensor 181 of the cleaner 10a in one embodiment may also be disposed on a bottom surface of the body 160. In the operating state, the edge sensor 181 is retracted into the bottom surface of the body 160, and presses against the surface of the window. When the edge sensor 181 reaches the edge of the window, the edge sensor 181 cannot press against the surface. So, the edge sensor 181 becomes a projecting state, and transmits the signal to the control system 140, which immediately stops the cleaner 10a from moving forwards, and enables the cleaner 10a to make a turn or move backwards.

Figure 4A:
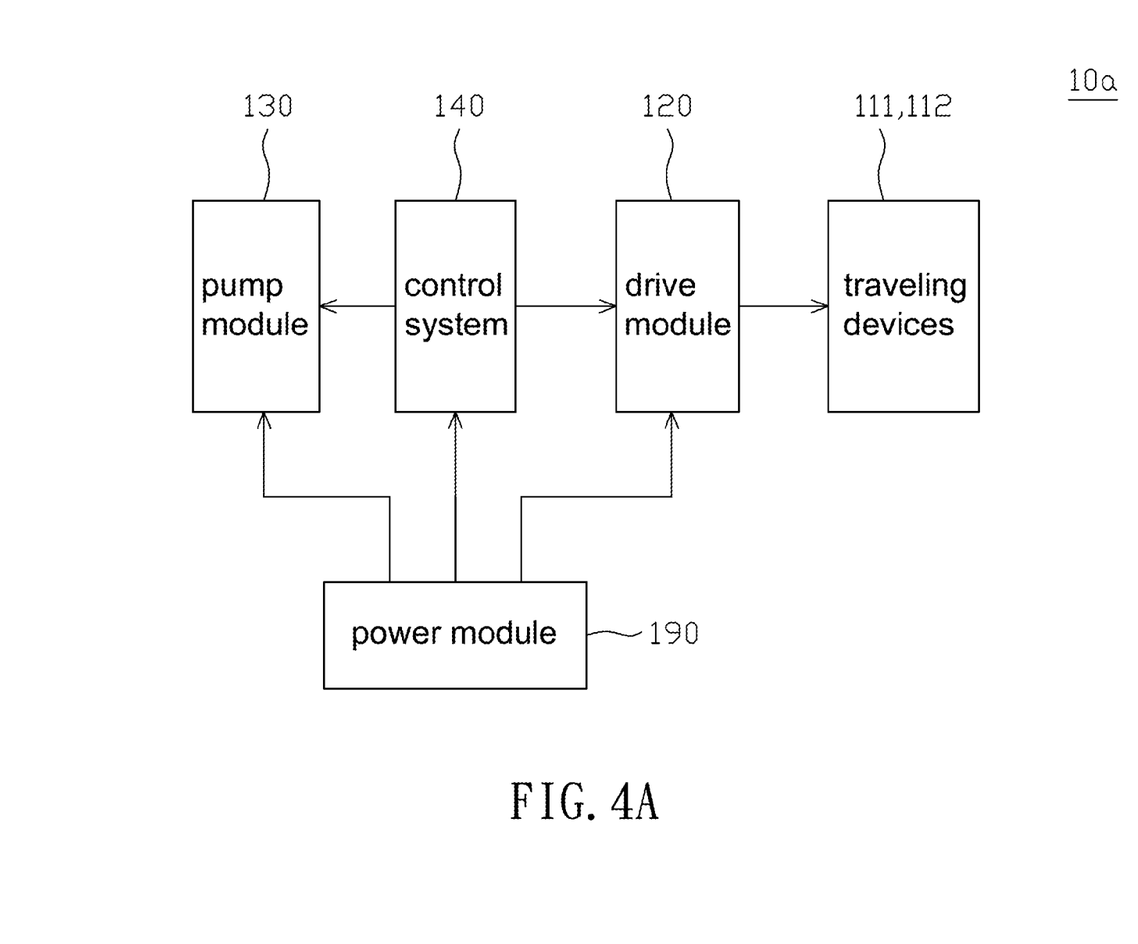
FIG. 4A is a functional block diagram showing the cleaner according to the embodiment of the present invention.

FIG. 4A is a functional block diagram showing the cleaner according to the embodiment of the present invention. Referring to FIG. 4A, the cleaner 10a in this embodiment further comprises a drive module 120, a control system 140 and a power module 190. The power module 190 electrically connected to the pump module 130, the drive module 120 and the control system 140 provides a power to the pump module 130, the drive module 120 and the control system 140. In one embodiment, the power module 190 may comprise a battery module and further comprise a battery charge sensing module (not shown). When the battery charge of the cleaner 10a is insufficient, the battery charge sensing module outputs the warning sound, warning light or the like. At this time, the user is informed and warned to remove the cleaner 10a from the plate. In one embodiment, the cleaner 10a may comprise a power cable to be electrically connected to a socket. In this embodiment, the electric power is typically supplied by the power cable. When the power is off, the power module 190 may serve as a backup power, and output the warning sound, warning light or the like at the same time. The control system 140 is coupled to the pump module 130 and the drive module 120. The drive module 120 receives the control signal of the control system 140 to drive the traveling devices 111 and 112 to rotate, so that the rotating traveling device 111 or traveling device 112 is displaced.

Figure 4B:
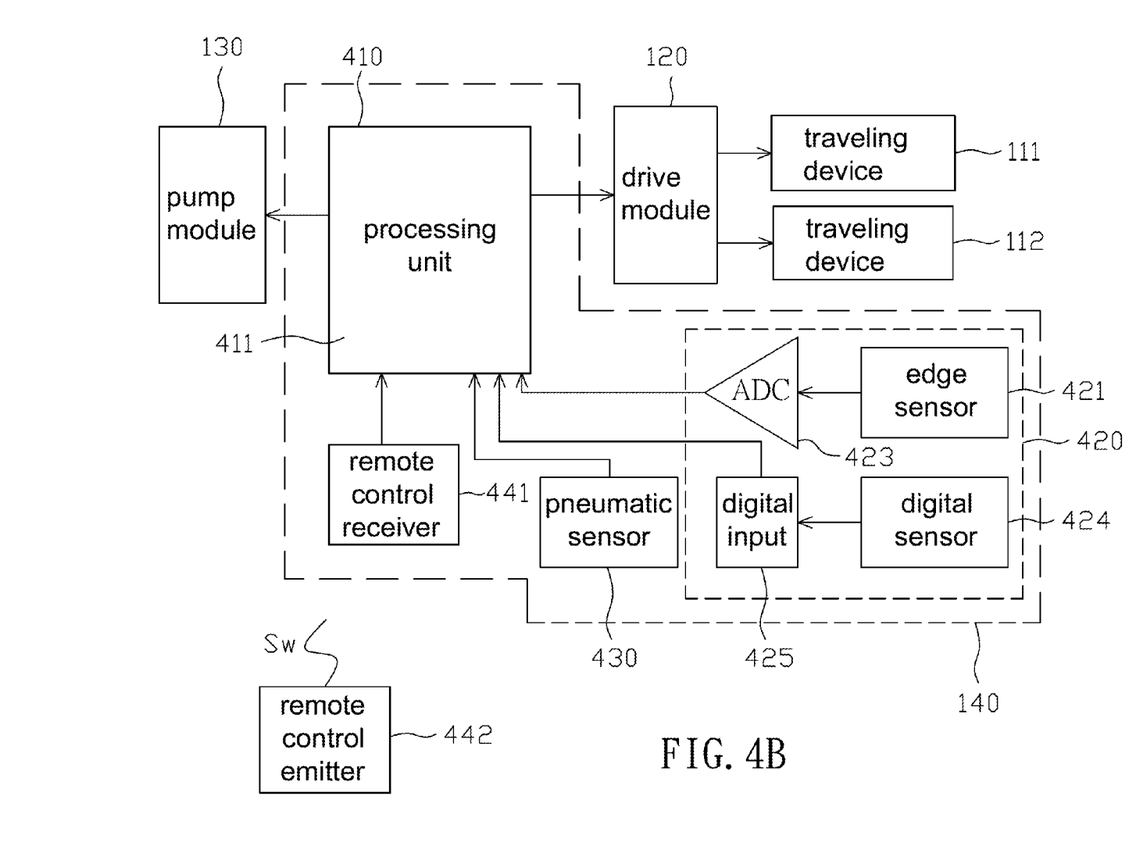
FIG. 4B is a functional block diagram showing the cleaner according to the embodiment of the present invention.

FIG. 4B is a functional block diagram showing the cleaner according to the embodiment of the present invention. Referring to FIG. 4B, the control system 140 comprises a processing unit 410 and a sensing unit 420. The processing unit 410 controls the drive module 120 to drive the traveling devices 111 and 112. The processing unit 410 controls the pump module 130 to control the negative pressure of the closed space.

In one embodiment, the control system 140 may further comprise a remote control receiver 441. The remote control receiver 441 receives a remote control signal Sw of a remote control emitter 442, so that the control system 140 controls a traveling path of the cleaner 10a according to the remote control signal Sw. The signal transmission between the remote control receiver 441 and the remote control emitter 442 may be, for example, infrared transmission or wireless transmission, wherein the wireless transmission may be, for example, ZigBee, bluetooth, RFIO, Wi-Fi or the like.

The remote control functions of the cleaner 10a comprise, for example, a system reset function, an automatic home-return function, a complete start function, an on-the-spot start function and a manual mode function, which will be further described in the following. The automatic home return function represents that the cleaner 10a automatically moves to a position where the user can easily take the cleaner 10a after cleaning. The position is, for example, the lower middle position of the plate. The complete start function represents that after the cleaner 10a travels to the top end of the plate, the cleaner 10 starts from the top end to perform the cleaning action from left to right (or from right to left) and then from top to bottom. The on-the-spot start function represents that the cleaner starts, on the spot, to perform the cleaning action from left to right (or from right to left) and then from top to bottom. The manual mode function comprises the functions of controlling the on-the-spot cleaning of the cleaner or controlling the function of upward, downward, leftward and right movements of the cleaner 10a.

In one embodiment, the cleaner 10a has the function of detecting the edges of the windows and doors. As shown in FIG. 4B, the sensing unit 420 may comprise an edge sensor 421 and an analog-to-digital converter 423. The analog-to-digital converter 423 is coupled between the edge sensor 421 and the processing unit 410. The edge sensor 421 can detect the edge of the plate or a foreign object on the plate. The edge sensor 421 may be an analog sensor, and may be a distance sensor, such as an infrared, laser, ultrasonic sensor or the like. In addition, the edge sensor may also be, for example, a limit switch or a proximity switch. The control system 140 can read the sensing value of the edge sensor 421 through the analog-to-digital converter 423, and thus determine the distance between the cleaner and the edge of the plate. Specifically, if the plate is a glass plate without a door or window frame and when the sensing value is lower than a low threshold value, it represents that no sensing value reflected from the glass is currently received (i.e., the cleaner 10a has currently approached the edge of the glass). On the other hand, if the plate is a glass plate with a door or window frame mounted on the edge and when the sensing value is higher than a high threshold value (predefined value), then it represents that the cleaner 10a has currently approached the door or window frame, and the reflected sensing value with the higher intensity is received.

In one embodiment, the sensing unit 420 may comprise a digital sensor 424 and a digital input 425. The digital sensor 424 senses the frame of the window or door by the method using a mechanism to touch the edge of the window or door. The digital sensor 424 is a limit switch or a proximity switch, for example. The digital input 425 may be a button input or an input of the digital sensor 424.

In addition, in one embodiment, the object of distributing the acting force of the negative pressure of the closed space may also be achieved without using the design that the area of the first region Aa of the space defined by the suction cup 170 is larger than the area of the second region Aw of the space defined by the body 160. FIG. 5 is a front view showing a cleaner according to another embodiment of the present invention. As shown in FIG. 5, the area Aa of the region of the space defined by the suction cup 170 is substantially the same as the area Aa of the region of the space defined by the body 160. In addition, at least one elastic member 173 is further disposed between the suction cup 170 and the body 160, and the elastic forces of the elastic members 173 keep the suction cup 170 in close contact with the surface of a plate. According to the designed structure of this embodiment, when the traveling devices 111 and 112 travel on or to the obstructer, the elastic forces of the elastic members 173 are exerted on the suction cup 170 to prevent the leakage of the closed space. Thus, the cleaner 10a is absorbed onto the operation surface by the sum of the acting force of the negative pressure and the elastic forces of the elastic members 173.

Figure 6:
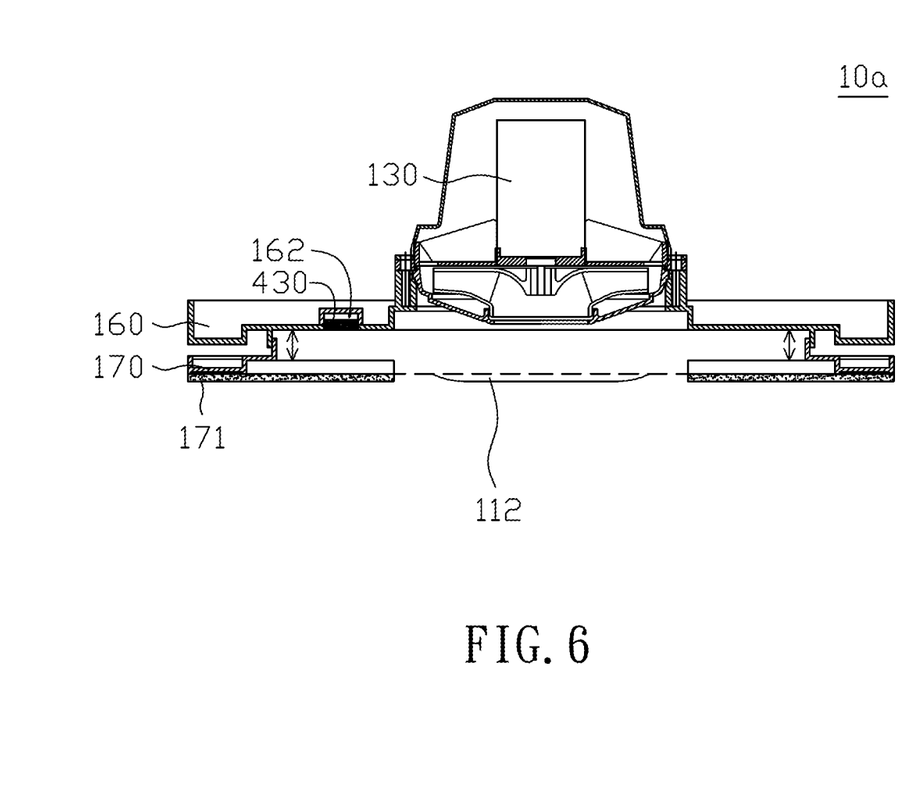
FIG. 6 is a front view showing the cleaner according to another embodiment of the present invention.

FIG. 6 is a front view showing the cleaner according to another embodiment of the present invention. Referring to FIG. 6, the body 160 is further defined with a chamber 162 communicating with the closed space defined by the body 160 and the suction cup 170. Referring to FIGS. 6 and 4B, the control system 140 further comprises a pneumatic sensor 430. The pneumatic sensor 430 senses the pressure of the closed space defined by the body 160 and the suction cup 170 regularly or irregularly, and transmits a signal to the control system 140 to monitor the pressure of the closed space sensed by the pneumatic sensor 430. When the pressure of the closed space is lowered to a predetermined value, or is lowered at a predetermined speed, the control system 140 immediately stops the cleaner 10a from moving forward, and returns to the original position or moves forward or backward until the pressure of the closed space returns to the normal state.

In one embodiment, the pneumatic sensor 430 may be a piezoelectric converter comprising a piezoelectric material capable of generating a piezo effect, which means that a voltage is generated when a pressure is applied on its surface, and the magnitude of the pressure can be determined according to the crystal property presented by the generated voltage. In one embodiment, the pneumatic sensor 430 may be a pressure transducer, which is a piezo-resistive bridge on a surface of a silicon chip. A backside of the chip is drilled, and thus a pressure diaphragm is formed between the backside and the inside of the chip. The pressure range is determined according to the thickness of the diaphragm. When the pressure is applied onto the chip, the diaphragm deforms so that the resistance value of the bridge is changed according to the pressure ratio.

According to the prior art, the current sensor 600 is disposed at the current input terminal of the exhaust blower. Because the current of the current input terminal of the exhaust blower is mainly sensed, the time of judging the leakage according to the current change is later than the time of leakage. When the leakage amount is large, the robot cannot immediately react and thus falls off the window. Compared with the prior art, the pressure of the closed space can be immediately detected in this embodiment, and the traveling direction can be immediately corrected to prevent the robot from falling off the window.

According to one embodiment of the present invention, the suction cup 170 is disposed such that it can move relative to the body 160. So, when the traveling devices 111 and 112 travel on the obstructer, the suction cup 170 moving relative to the body 160 can be in close contact with the plate to keep the airtight property of the closed space defined by the plate, the body 160 and the suction cup 170, and the leakage of the closed space can be avoided. In one embodiment, the area of the first region Aa of the space defined by the suction cup 170 is further larger than the area of the second region Aw of the space defined by the body 160, the acting force of the negative pressure on the traveling devices 111 and 112 and the acting force on the suction cup 170 are distributed according to the ratio of the area of the second region Aw to the area of the residual region Ac. In one embodiment, at least one elastic member 173 is further disposed between the suction cup 170 and the body 160. According to the structure of this embodiment, when the traveling devices 111 and 112 travel on the obstructer, the elastic forces of the elastic members 173 are exerted on the suction cup 170 to prevent the leakage of the closed space. Thus, the cleaner 10a is absorbed onto the operation surface by the sum of the acting force of the negative pressure and the elastic forces of the elastic members 173.

What is claimed is:
1. A robot adapted to movement on a surface of a plate, the robot comprising:
   a body;
   at least one traveling device, which is disposed in the body for causing the robot to move on the surface of the plate;
   a suction cup, a part of the suction cup being movably disposed in the body; and
   a pump module disposed in the body, wherein
   the suction cup can move relative to the body in a direction along a normal of a bottom surface of the suction cup, and upon an operation of the robot, the body, the suction cup and the plate form a closed space, wherein the closed space is kept at a negative pressure by use of the pump module; and
   an area of a first region of a space defined by the suction cup is substantially larger than or equal to an area of a second region of a space defined by the body,
   an acting force is caused by the negative pressure of the closed space,
   a first acting force of the acting force is substantially caused by the negative pressure in a residual region and distributed on the suction cup, wherein the residual region is the region of the first region outside the second region, a second acting force of the acting force is substantially caused by the negative pressure in the second region and distributed on the at least one traveling device.

2. The robot according to claim 1, wherein a ratio of the second acting force to the first acting force is substantially equal to a ratio of the area of the second region to an area of the residual region.

3. The robot according to claim 1, further comprising multiple pivots, wherein the suction cup is formed with multiple through holes and the pivots are inserted into the through holes, so that the suction cup can be movably fixed on the body and movable along long axes of the pivots.

4. The robot according to claim 3, wherein a length of the pivot is longer than a thickness of a portion of the suction cup defining the through hole.

5. The robot according to claim 3, wherein the long axes of the pivots are substantially parallel to the normal of the bottom surface of the suction cup.

6. The robot according to claim 1, wherein the at least one traveling device is disposed outside of the closed space and the robot is a cleaner.

7. The robot according to claim 6, further comprising a cleaning cloth attached to a bottom surface of the suction cup.

8. The robot according to claim 1, further comprising:

at least one elastic member disposed between the suction cup and the body, wherein an elastic force of the at least one elastic member keeps the suction cup in close contact with the surface of the plate.

9. The robot according to claim 1, wherein, the body further defines a chamber communicating with the closed space, and the robot further comprises a pneumatic sensor, which is disposed in the chamber and for sensing a pneumatic pressure of the closed space.

10. The robot according to claim 1, further comprising at least one edge sensor, which is disposed on a side surface or a bottom surface of the body and for sensing an edge of the plate.

* * * * *